US005501783A

United States Patent [19]

Kawasaki

[11] Patent Number: 5,501,783

[45] Date of Patent: Mar. 26, 1996

[54] CYLINDRICAL ELECTROSTATIC OIL CLEANER

[75] Inventor: Mariko Kawasaki, Tokyo, Japan

[73] Assignee: Kleentek Industrial Co., Ltd., Tokyo, Japan

[21] Appl. No.: 306,443

[22] Filed: Sep. 19, 1994

[30] Foreign Application Priority Data

Sep. 28, 1993 [JP] Japan .................................... 5-263083

[51] Int. Cl.[6] .................................................... B01D 35/06

[52] U.S. Cl. ............................................. 204/665; 204/671

[58] Field of Search ..................................... 204/186, 188, 204/189, 190, 302, 304–308; 210/243, 748

[56] References Cited

U.S. PATENT DOCUMENTS 5,352,347 10/1994 Reichert .................................. 204/302

FOREIGN PATENT DOCUMENTS 45-35519 11/1970 Japan .
47-25610 7/1972 Japan .
50-11109 4/1975 Japan .
53-139 1/1978 Japan .
57-46898 10/1982 Japan .
59-25488 7/1984 Japan .

*Primary Examiner*—John Niebling
*Assistant Examiner*—William T. Leader
*Attorney, Agent, or Firm*—Lowe, Price, LeBlanc & Becker

[57] ABSTRACT

A cylindrical electrostatic oil cleaner is provided for removing dust from an insulating liquid. The cleaner is constructed of a cylindrical receptacle, a plurality of cylindrical positive and negative electrode plates and insulating dust collectors. The positive and negative electrode plates are coaxially arranged in an opposing relationship within the receptacle, so that an innermost compartment is defined in a form surrounded by the innermost electrode plate and outer compartments are defined between the respective electrode plates. The insulating dust collectors are arranged in the innermost and outer compartments, respectively. Each of the dust collectors comprises a plurality of cylindrical collector elements which individually form a corrugated zigzag peripheral wall.

8 Claims, 6 Drawing Sheets

CYLINDRICAL ELECTROSTATIC OIL CLEANER

BACKGROUND OF THE INVENTION

1. Field of the Invention

This invention relates to an electrostatic oil cleaner for removing contaminant (hereinafter called "dust") from an insulating liquid such as turbine oil, lubeoil or machining or cutting oil by applying a high voltage across the insulating liquid.

More specifically, this invention is concerned with an electrostatic oil cleaner equipped with dust collectors having a novel construction—said dust collectors being arranged between electrode plates, between which a high voltage is applied, and being adapted to adsorb and remove dust from an insulating liquid—so that the removal rate (in other words, collection efficiency) of the dust from the insulating liquid has been improved considerably.

2. Description of the Related Art

Severe control is required these days on the cleanliness of oil employed in a hydraulic pressure system or a lubricating system in various industrial equipment. Defining the cleanliness in terms of the size and number of particulate contaminant (dust) in oil, for example, NAS Class 10 to 12 (the contamination level defined under NAS 1638; the number of dust in the range of 5–15 μm: 250,000 to 1,000,000 particles per 100 ml) is needed for general-purpose fresh oil, NAS Class 7 to 9 (supra, 30,000 to 100,000 particles per 100 ml) for NC machine oil, and NAS Class 4 (supra, 4,000 or fewer particles per 100 ml) for missile oil. There is an increasingly stringent demand for the reduction of particulate contaminant in oil.

Contamination of oil takes place as a result of accumulation of particulate contaminant pieces (dust) abraded off from equipment, sludge formed due to oxidation of the oil, pieces chipped off from surfaces of equipment due to cavitation erosion, etc.) in the oil in the course of use of the oil. By this contamination, normal operation of the equipment may be impaired.

A variety of measures have therefore been proposed for the prevention of oil contamination. Effectiveness of electrostatic oil cleaners is well known in the present field of art.

As is disclosed inter alia in Japanese Patent Publication Nos. SHO 45-35519, 47-25610, 50-11109, 53-139 and 57-46898 and Japanese Utility Model Publication No. SHO 59-25488, the above-mentioned electrostatic oil cleaners are each constructed of an electrostatic oil cleaning tank (receptacle), positive and negative electrode plates arranged in an opposing relationship within the receptacle, and a porous or fibrous dust collector (for example, a dust collector made of a non-woven fabric) arranged between the positive and negative electrodes so that a passage for oil as a liquid to be cleaned is formed on each side of the dust collector. By applying a high voltage (for example, 10 KV to 15 KV) is applied between the positive and negative electrode plates, whereby minute contaminant particles charged positive (+) or negative (–) in the oil are efficiently captured on the dust collector or the electrode plate of the opposite polarity and are hence removed.

Electrostatic oil cleaners of the above type are commercially available, for example, from KLEENTEK Industrial Co., Ltd., Tokyo, Japan under the name of "EDC (Electrostatic Dust Collector) Model 10", "EDC Model 25", "EDC Model 50", "EDC Model 100", etc.

In each electrostatic oil cleaner described above, dust which is in an insulating liquid, for example, a lubeoil is progressively adsorbed and densely deposits on the surfaces of the dust collector and also on the inner wall of the receptacle as the oil cleaner is operated. It is therefore necessary to periodically replace the dust collector and also clean the inner wall of the receptacle.

From the viewpoints of the readiness in manufacture and the installation space, those having a cylindrical electrostatic oil cleaner main body and an easily-replaceable, cylindrical cartridge-type dust collector are therefore sold on the market.

Examples of the above-described cylindrical electrostatic oil cleaners and cartridge-type dust collectors schematically illustrated in FIG. 3 through FIG. 8 of the accompanying drawings. To meet the above-described requirements, a receptacle main body (A) of the cylindrical electrostatic oil cleaner depicted in FIG. 3 out of the commercial cylindrical electrostatic oil cleaners has been constructed by dividing it into the following components:

an upper lid portion ($A_1$), a receptacle portion ($A_2$), and a high-voltage electrode portion ($A_3$) fixed within the receptacle via an insulator ($A_{31}$)

and also arranging the following component:

a joint portion between an opening upper end portion of the receptacle portion ($A_2$) and the upper lid portion ($A_1$), Incidentally, symbol $A_4$ in FIG. 3 indicates an O-ring mounted on the joint portion to seal the joint portion.

Further, designated at letter B in FIG. 3 is a band coupling which is illustrated in detail in FIG. 4 and serves to tighten and unite the individual portions together.

The cylindrical electrostatic oil cleaner of the above-described construction is superior compared with a conventional electrostatic oil cleaner constructed of a box-shaped receptacle in the form of a cube or rectangular parallelepiped and plural sets of electrode plates disposed within the receptacle. Described specifically, the conventional electrostatic oil cleaner making use of the box-shaped receptacle is extremely difficult to clean the inner wall of the receptacle and the electrode plates. When a particularly high collection efficiency is required, the inner wall of the receptacle and the electrodes must be cleaned thoroughly. A receptacle of this type is however not easy to work with and moreover, hardly permits complete cleaning.

In the above-described conventional electrostatic oil cleaner equipped with the box-shaped receptacle, a corrugated dust collector is disposed between each two adjacent electrode plates of the plural sets of electrode plates arranged in parallel with each other.

On the other hand, one example of the cartridge-type dust collector units arranged inside the cylindrical electrostatic oil cleaners is shown in FIG. 5. Incidentally, the dust collector unit depicted in FIG. 5 is designated by symbol C' to distinguish it from dust collector unit C which will be described subsequently herein and are useful in the practice of the present invention.

The conventional dust collector unit C' shown in FIG. 5 has been constructed by enclosing—within an electrode member E, which also serves as a casing—a dust collector element $C'_1$, for example, a dust collector element $C'_1$ formed by folding a sheet of filter paper into a zigzag form and then rolling it into a cylindrical shape so that the effective contact area with contaminated oil is enlarged.

In the conventional cylindrical electrostatic oil cleaners, the dust collector elements ($C'=C'_1+C'_2+\ldots C'_n$) and electrode members ($E=E_1+E_2+\ldots E_n$) are arranged as many as needed depending on the diameter of the receptacle or the collection efficiency desired to be achieved.

FIGS. 6 and 7 illustrate another example of conventional dust collectors C', which is different from the conventional dust collector shown in FIG. 5. FIG. 6 is a perspective view, while FIG. 7 is a plan view. As is shown in these drawings, this conventional dust collector is constructed of three electric field layers ($E_1$ to $E_3$) and each layer has a single layer of dust collector element.

FIG. 8 illustrates a further example of conventional dust collectors C', which is also different from the conventional dust collector shown in FIG. 5. As is envisaged from the drawing, the conventional dust collector of FIG. 8 has the same diameter as that illustrated in FIGS. 6 and 7. There are however seven electric field layers ($E_1$ to $E_7$), and each layer has a single layer of dust collector element.

If the distance between the electrode plates is reduced with a view to improving the collection efficiency in each conventional electrostatic oil cleaner of the above-described construction, a current is rendered easier to flow. This electrostatic oil cleaner is accompanied by the drawback that a current flows to form a short circuit if the insulating liquid itself, such as lubeoil, contains an additive facilitating flow of a current therethrough or a small amount of water.

Incidentally, it is the well-known fact that the collection efficiency is improved further as the distance between electrode plates is made shorter and the voltage applied between the electrode plates is increased.

Occurrence of the above-described short circuiting leads to serious drawbacks such as:

As the capacity of a high-voltage power supply is limited, the voltage is lowered, leading to a reduction in the efficiency.

A protective device for the prevention of short circuiting is actuated to stop the electrostatic oil cleaner, so that the electrostatic oil cleaner cannot be operated any longer.

SUMMARY OF THE INVENTION

The present invention has been completed to overcome the above-described drawbacks of the conventional cylindrical electrostatic oil cleaners.

With a view to overcoming the above-described drawbacks of the conventional cylindrical electrostatic oil cleaners, the present inventors have proceeded with an extensive investigation. As a result, it has been found that the dust collection efficiency can be improved significantly when two or more cylindrical dust collectors in the form of corrugated zigzag peripheral walls are coaxially arranged between each two adjacent electrode plates while maintaining the distance between the electrode plates at a desired value.

Based on the above finding, the present invention has provided a cylindrical electrostatic oil cleaner having excellent collection efficiency.

In one aspect of the present invention, there is thus provided a cylindrical electrostatic oil cleaner for removing dust from an insulating liquid, said cleaner having a cylindrical receptacle, a plurality of cylindrical positive and negative electrode plates coaxially arranged in an opposing relationship within the receptacle, thereby defining an innermost compartment surrounded by the innermost electrode plate and outer compartments defined between the respective electrode plates, and insulating dust collectors arranged in the innermost and outer compartments, respectively, characterized in that each of the dust collectors comprises a plurality of cylindrical collector elements which individually form a corrugated zigzag peripheral wall.

Preferably, the cleaner further comprises an insulating partition arranged between each two adjacent collector elements of each dust collector.

Each dust collector can desirably be formed of two or three collector elements.

Owing to the construction described above, the cylindrical electrostatic oil cleaner according to the present invention has a collection efficiency significantly improved over the conventional cylindrical electrostatic oil cleaners equipped with single layer dust collectors arranged between electrode plates.

When a high collection efficiency is desired, it has heretofore been the practice to decrease the distance between each two adjacent electrode plates so that a strong electric field is formed between the electrode plates. In this case, there is the potential danger that a current may flow to form a short circuit. The construction of the dust collectors employed in the present invention, however, has made it possible to achieve a high collection efficiency while fully avoiding such a potential danger.

Further, the dust collectors employed in the present invention can be conveniently formed into a cartridge-type dust collector unit owing to their construction. Their replacement can therefore be facilitated and further, the inside of the receptacle of the cylindrical electrostatic oil cleaners can be easily cleaned. The electrostatic oil cleaner can therefore be operated with a high collection efficiency over a long period of time.

DETAILED DESCRIPTION OF THE INVENTION AND PREFERRED EMBODIMENTS

The technical features and embodiments of the present invention will hereinafter be described in detail with reference to the accompanying drawings. Needless to say, it should be borne in mind that the present invention is not limited to the illustrated embodiments.

Figure 1:
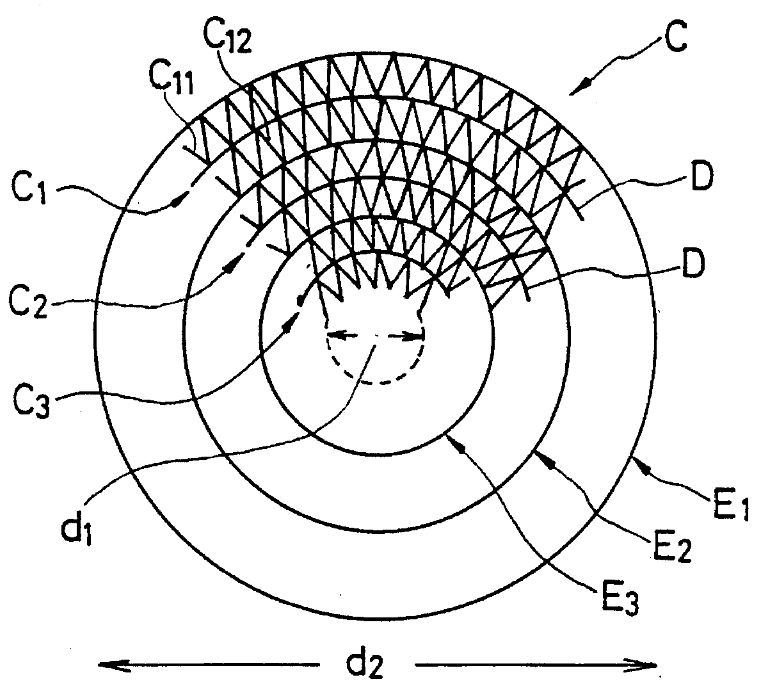
FIG. 1 is a plan view of a dust collector unit suitable for use in a cylindrical electrostatic oil cleaner according to a first embodiment of the present invention.

Referring first to FIG. 1, the dust collector unit employed in the cylindrical electrostatic oil cleaner according to the first embodiment of the present invention will be described.

As is illustrated in the drawing, the dust collector unit C in the first embodiment is characterized in that each of cylindrical dust collectors $C_1,C_2,C_3$ arranged between respective electrodes is not constructed as a single layer unlike the conventional cylindrical electrostatic oil cleaners but is formed in two layers.

In the collector unit C shown in FIG. 1, three electric field layers are formed by three electrode plates $E_1,E_2,E_3$. In the individual electric field layers, double-layer collector elements ($C_1=C_{11}+C_{12}$, $C2=C_{21}+C_{22}$, $C_3=C_{31}+C_{32}$) are arranged.

In the collector unit C shown in FIG. 1, a partition D is disposed between each two adjacent collector elements (namely, between $C_{11}$ and $C_{12}$, between $C_{21}$ and $C_{22}$, and between $C_{31}$ and $C_{32}$).

It is to be noted that the partitions D are not absolutely needed in the present invention. When the partitions D are not arranged, it is necessary to arrange each two adjacent collector elements, namely, corrugated peripheral walls in such a way that they do not bite each other, in other words, ridges and valleys formed by folding a sheet of filter paper are kept out of overlapping, upon arrangement, with valleys and ridges formed by folding another sheet of filter paper. In upper and/or lower parts of individual collector elements, for example, each two adjacent collector elements can be fixed together by adhesion or like of their ridges and valleys (or their valleys and the ridges) so that the collector elements are prevented from overlapping.

In the present invention, the collector elements $C_{11},C_{12}$ and the partitions D can be made of paper or non-woven fabric sheet, which has been impregnated with a phenol resin and then subjected to curing to enhance its insulating property.

Further, no particular limitation is imposed on the electrode plates ($E_1,E_2,E_3$) insofar as they can withstand impression of a high voltage. For example, they can be formed of an aluminum plate.

In the collector unit C shown in FIG. 1, a center electrode member is centrally arranged in a receptacle main body. As the manner of application of a high voltage to the center electrode and the electrode plates which are arranged coaxially with each other, it is only necessary to apply a voltage so that the center electrode member and the electrode plates alternately become high-voltage electrodes and ground electrodes. In the present invention, positive and negative electrode plates are provided in the manner described above.

The cartridge-type cylindrical dust collector unit C employed in the cylindrical electrostatic oil cleaner according to the second embodiment of the present invention will next be described with reference to FIG. 2.

The basic construction of the cylindrical dust collector unit C is similar to that employed in the first embodiment shown in FIG. 1, but is different only in that in the three electric field layers, triple-layer collector elements ($C_1=C_{11}+C_{12}+C_{13}$, $C_2=C_{21}+C_{22}+C_{23}$, $C_3=C_{31}+C_{32}+C_{33}$) are arranged in each electric field layer. Because the collector elements are arranged in three layers in each electric field layer, two partitions ($D=D_1+D_2$) are disposed between the adjacent collector elements.

The present invention will hereinafter be described in further detail by the following example.

Fabrication of collector units (i) The cylindrical dust collector unit C shown in FIG. 1 was fabricated. It centrally defined a cylindrical center compartment having a diameter ($d_1$) of 29 mm. Its outer diameter ($d_2$) was 204 mm and its height was 200 mm. The three electric field layers shown in FIG. 1 were each formed of two layers of collector elements.

The fold width (pitch) of each collector element was 14 mm, and the intervals of the adjacent electrode plates ($E_1,E_2,E_3$) were 29 mm. This dust collector unit will hereinafter be referred to as a dust collector unit 1 (invention product).

Figure 2:
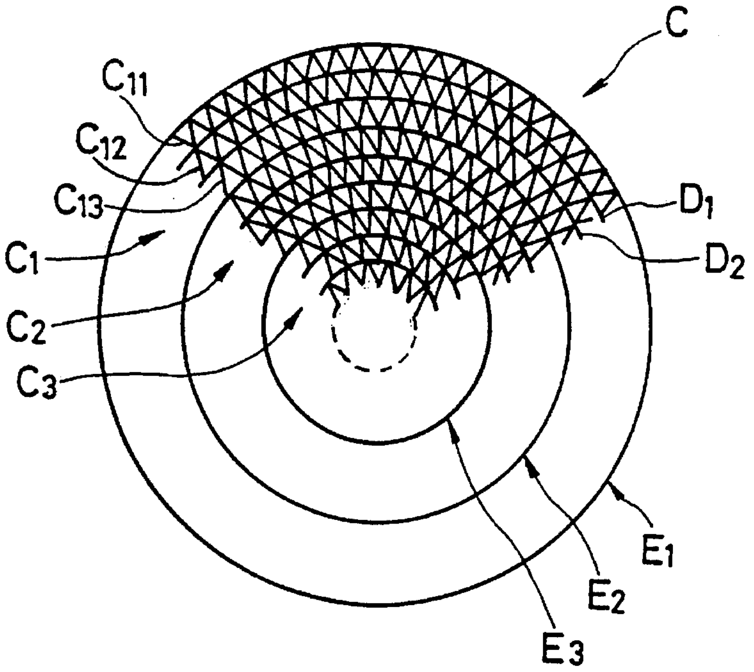
FIG. 2 is a plan view of a dust collector unit suitable for use in a cylindrical electrostatic oil cleaner according to a second embodiment of the present invention.

(ii) Similarly to the above dust collector unit 1, the cylindrical collector unit C shown in FIG. 2 was fabricated. Each electric field layer was formed of three layers of collector elements. This collector unit will hereinafter be referred to as a dust collector unit 2 (invention product).

Figure 7:
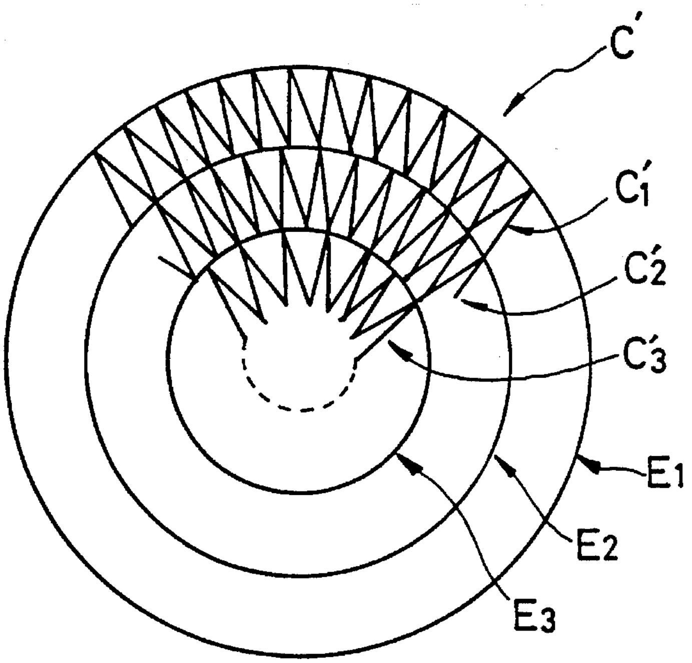
Fig. 7 PRIOR ART
FIG. 7 is a plan view of the conventional dust collector unit shown in FIG. 6.

(iii) The conventional dust collector unit C' depicted in FIG. 7 was fabricated. It had three layers of electric field layers. Each electric field layer was constructed of a single layer of collector element. The dimensions of the cylindrical collector unit C' such as the size of the cylindrical center compartment and the outer diameter of the cylindrical collector unit, as well as the distance between the adjacent electrode plates were the same as the corresponding values in the dust collector unit 1. Incidentally, the fold width (pitch) of each collector element was 28.5 mm. This dust collector unit will hereinafter be referred to as a dust collector unit 3 (conventional product).

Figure 8:
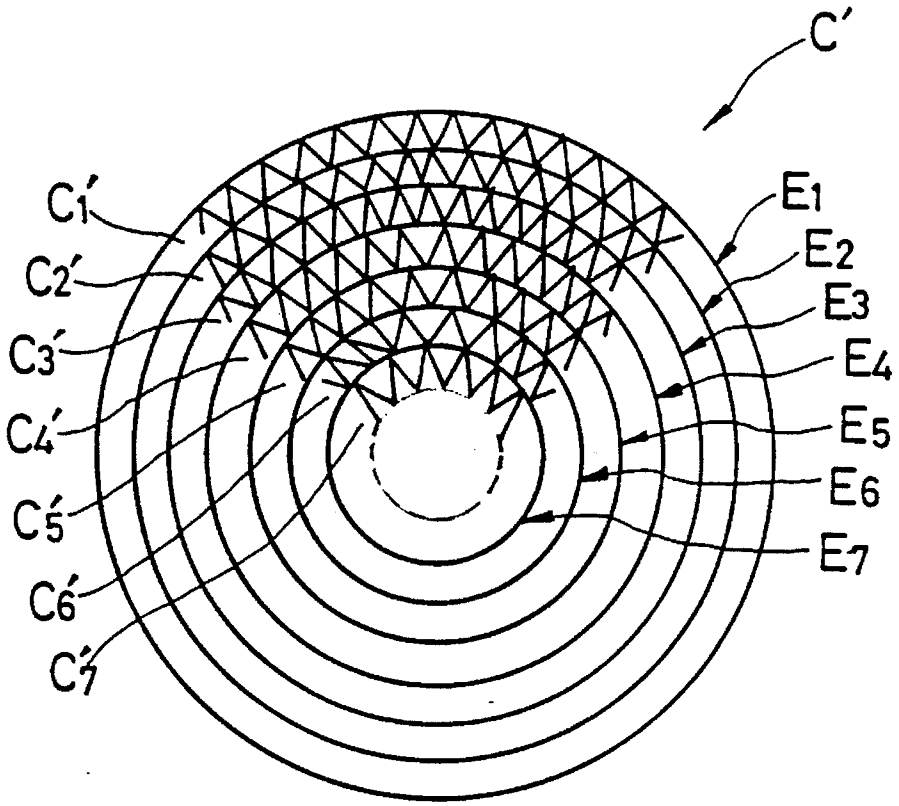
Fig. 8 PRIOR ART
FIG. 8 is a plan view of a third example of the conventional dust collector units.

(iv) The conventional dust collector unit C' shown in FIG. 8 was fabricated. It had seven layers of electric fields, each of which was constructed of a single layer of collector element. The dimensions of the cylindrical collector unit C' such as the size of the cylindrical center compartment and the outer diameter of the cylindrical collector unit, were the same as the corresponding values in the dust collector unit 1. Each collector element had the same fold width (pitch) as in the dust collector units 1 and 2. The distance between the adjacent electrode plates was 12.5 mm. This dust collector unit will hereinafter be referred to as a dust collector unit 4 (conventional product).

Performance Evaluation of the Individual Dust collector Units

Figure 3:
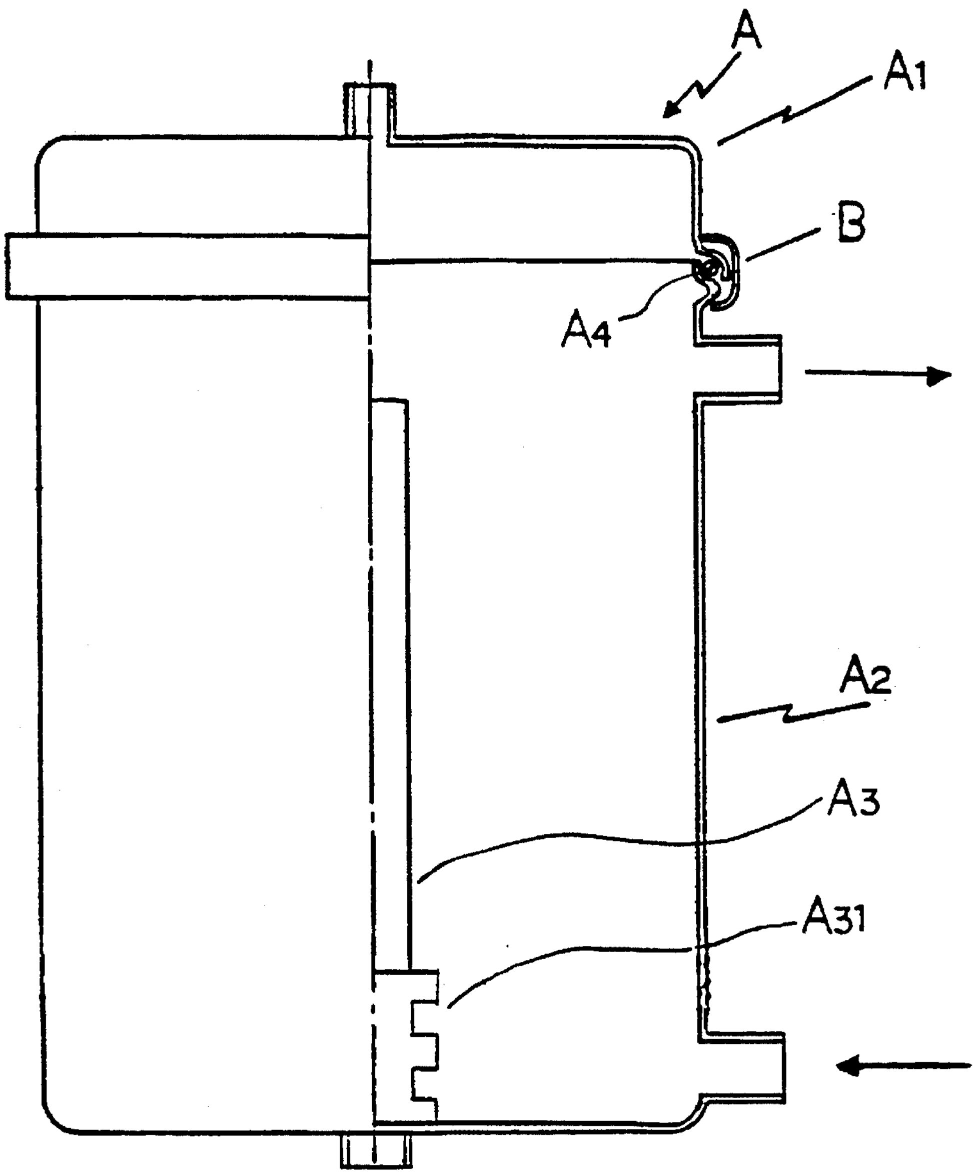
FIG. 3 is a partly cut-away front view of a receptacle main body of a cylindrical electrostatic oil cleaner.
Figure 4:
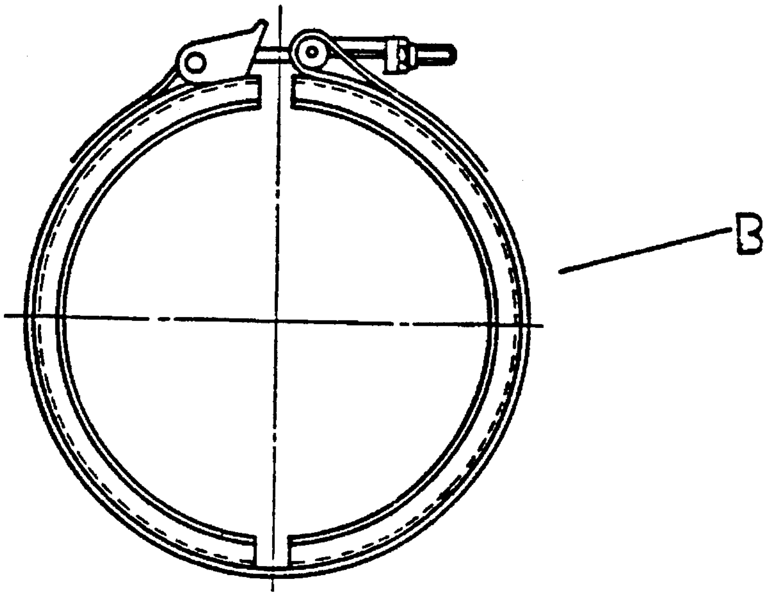
FIG. 4 is a plan view of a band coupling useful in assembling the receptacle main body of the cylindrical electrostatic oil cleaner.
Figure 5:
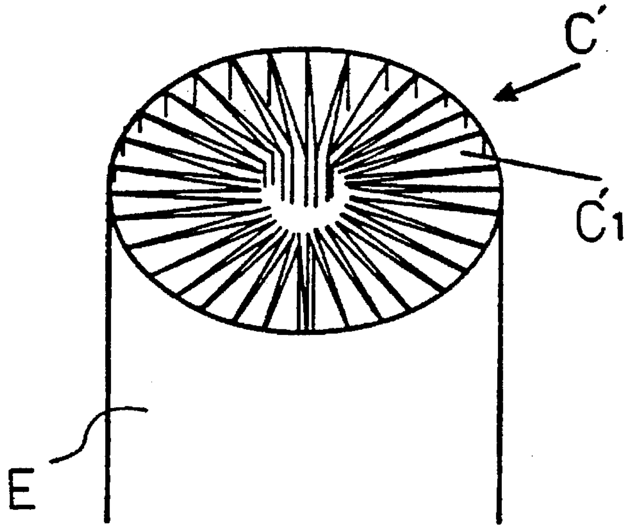
Fig. 5 PRIOR ART
FIG. 5 is a perspective view of a first example of conventional dust collector units.
Figure 6:
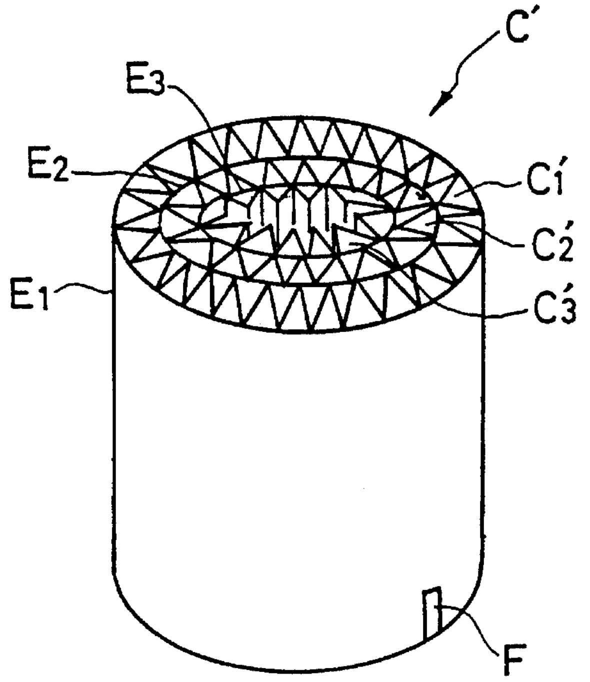
Fig. 6 PRIOR ART
FIG. 6 is a perspective view of a second example of the conventional dust collector units.

The above-described various dust collector units (1 to 4) were placed in the cylindrical electrostatic oil cleaner illustrated in FIG. 3, and their performances were evaluated.

The experiment was conducted under the following conditions:

(1) Oil employed in the experiment

"MITSUI HIDEC #56" [trade name, working oil, product of Mitsui Petrochemical Industries, Ltd.; 100 l (oil temperature: 40° C)] was charged in an oil tank. The oil tank was connected to the cylindrical electrostatic oil cleaner and the experiment was then conducted.

(2) Amount of mixed dust

The above oil was mixed with 40 g of the standard dust consisting of eleven dust sizes as prescribed in the Japanese Industrial Standard.

(3) Electrostatic oil cleaner

"EDC-RIO" (trade name, manufactured by KLEENTEK Industrial Co., Ltd., Tokyo, Japan), flow rate: 2.2 l/min. Applied voltage: 10 KV.

(4) Target cleanliness

The above dust-mixed oil was treated to clean the oil until the dust content was lowered to below 0.2 mg/100 ml.

Figure 9:
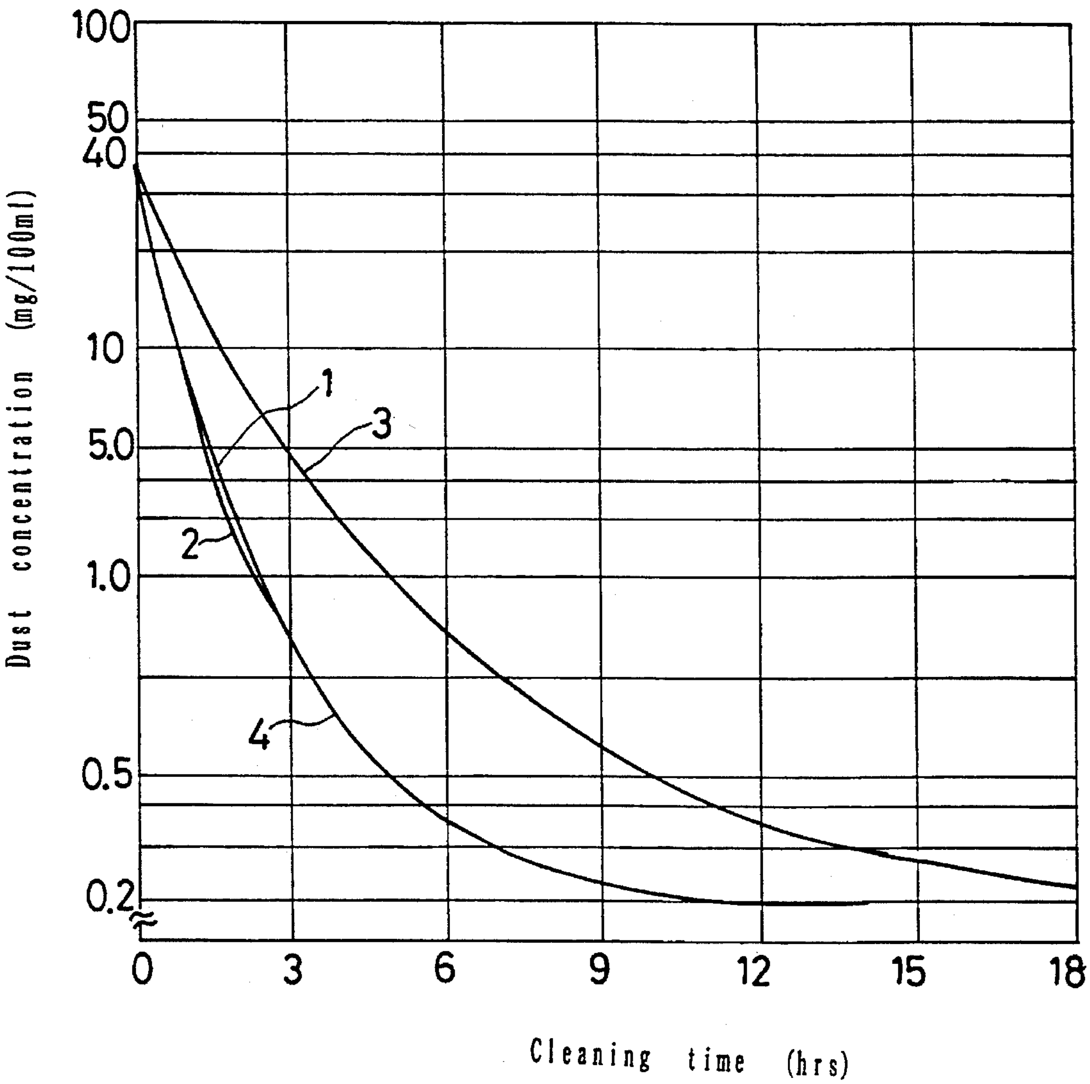
FIG. 9 is a diagram illustrating dust collecting performances of various dust collector units.

The results of the experiment are presented in FIG. 9, in which dust concentrations (mg/100 ml) and cleaning times (hrs) are plotted along the axis of ordinates and the axis of abscissas, respectively.

As is appreciated from FIG. 9, the dust collector units 1 and 2 according to the present invention can achieve collection efficiency twice as high as that available from the use of the dust collector unit 3 (conventional product) having the same electrode plate arrangement.

Further, the dust collector units 1 and 2 according to the present invention can achieve collection efficiency substantially equal to that available from the use of the dust collector unit 4 (conventional product) having seven layers of electrode plates. The dust collector unit 4 (conventional product) is however accompanied by the drawbacks that it involves a high risk of short circuiting and the dust collector unit has a complex construction and is hence expensive.

What is claimed is:

1. A cylindrical electrostatic oil cleaner for removing dust from an insulating liquid, comprising:

a cylindrical receptacle;

a plurality of cylindrical positive and negative electrode plates coaxially arranged in an opposing relationship within said receptacle, thereby defining an innermost compartment surrounded by the innermost electrode plate and outer compartments defined between the respective electrode plates; and a plurality of coaxially arranged insulating dust collectors, one insulating dust collector arranged in the innermost compartment and in each of the outer compartments, respectively, each of said insulating dust collectors comprising a plurality of cylindrical collector elements, each cylindrical collector element forming a corrugated zigzag peripheral wall in said innermost compartment and each said outer compartment, said cylindrical collector elements being in lateral side-by-side relationship in said innermost compartment and each of said outer compartments.

2. A cylindrical electrostatic oil cleaner according to claim 1, wherein said plurality of cylindrical collector elements further comprises a pair of cylindrical collectors in each compartment.

3. A cylindrical electrostatic oil cleaner according to claim 2, wherein said cleaner further comprises an insulating partition arranged between said pair of collector elements.

4. A cylindrical electrostatic oil cleaner according to claim 1, wherein said plurality of cylindrical collector elements further comprises three cylindrical collector elements in each compartment.

5. A cylindrical electrostatic oil cleaner according to claim 5, wherein said cleaner further comprises an insulating partition arranged between adjacent ones of said three cylindrical collector elements.

6. A cylindrical electrostatic oil cleaner for removing dust from an insulating liquid, comprising:

a cylindrical receptacle;

a plurality of cylindrical positive and negative electrode plates coaxially arranged in an opposing relationship within said receptacle, thereby defining an innermost compartment surrounded by the innermost electrode plate and outer compartments defined between the respective electrode plates; and a plurality of coaxially arranged insulating dust collectors, one dust collector in the innermost compartment and in each of the outer compartments, respectively, each of said insulating dust collectors comprising a plurality of cylindrical collector elements, each cylindrical collector element forming a corrugated zigzag peripheral wall in said innermost compartment and each of said outer compartments wherein said cleaner further comprises an insulating partition arranged between adjacent cylindrical collector elements in each compartment.

7. A cylindrical electrostatic oil cleaner according to claim 6, wherein said plurality of cylindrical collector elements comprises a pair of cylindrical collector elements in each compartment.

8. A cylindrical electrostatic oil cleaner according to claim 6, wherein said plurality of cylindrical collector elements comprises three cylindrical collector elements in each compartment.

* * * * *